US008558511B2

(12) United States Patent
Hammerstrom

(10) Patent No.: US 8,558,511 B2
(45) Date of Patent: Oct. 15, 2013

(54) METHOD AND APPARATUS FOR SMART BATTERY CHARGING INCLUDING A PLURALITY OF CONTROLLERS EACH MONITORING INPUT VARIABLES

(75) Inventor: Donald J. Hammerstrom, West Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 943 days.

(21) Appl. No.: 12/384,766

(22) Filed: Apr. 7, 2009

(65) Prior Publication Data

US 2010/0253290 A1  Oct. 7, 2010

(51) Int. Cl.
*H02J 7/00* (2006.01)

(52) U.S. Cl.
USPC .......................................... 320/137; 320/147

(58) Field of Classification Search
USPC .................... 320/137, DIG. 11, DIG. 12, 147
See application file for complete search history.

(56) References Cited

U.S. PATENT DOCUMENTS

| | | | |
|---|---|---|---|
| 5,467,006 A | | 11/1995 | Sims |
| 5,541,489 A | * | 7/1996 | Dunstan .................... 320/134 |
| 5,548,200 A | | 8/1996 | Nor et al. |
| 5,686,815 A | * | 11/1997 | Reipur et al. ............... 320/116 |
| 5,751,137 A | * | 5/1998 | Kiuchi et al. .................. 322/14 |
| 6,437,542 B1 | * | 8/2002 | Liaw et al. .................. 320/147 |
| 8,116,915 B2 | | 2/2012 | Kempton |
| 2008/0052145 A1 | | 2/2008 | Kaplan et al. |
| 2008/0203973 A1 | | 8/2008 | Gale et al. |

FOREIGN PATENT DOCUMENTS

| | | |
|---|---|---|
| GB | 2273614 A | 6/1994 |
| WO | PCT/US/2010/030149 | 12/2010 |
| WO | PCT/US2010/030149 | 10/2011 |

OTHER PUBLICATIONS

Frequency and Load; last updated Oct. 17, 2011; http://en.wikipedia.org/wiki/Utility_frequency#Frequency_and_load; 1 pp.

* cited by examiner

*Primary Examiner* — Yalkew Fantu
*Assistant Examiner* — Manuel Hernandez
(74) *Attorney, Agent, or Firm* — Wells St. John P.S.

(57) ABSTRACT

A method for managing the charging and discharging of batteries wherein at least one battery is connected to a battery charger, the battery charger is connected to a power supply. A plurality of controllers in communication with one and another are provided, each of the controllers monitoring a subset of input variables. A set of charging constraints may then generated for each controller as a function of the subset of input variables. A set of objectives for each controller may also be generated. A preferred charge rate for each controller is generated as a function of either the set of objectives, the charging constraints, or both, using an algorithm that accounts for each of the preferred charge rates for each of the controllers and/or that does not violate any of the charging constraints. A current flow between the battery and the battery charger is then provided at the actual charge rate.

21 Claims, 3 Drawing Sheets

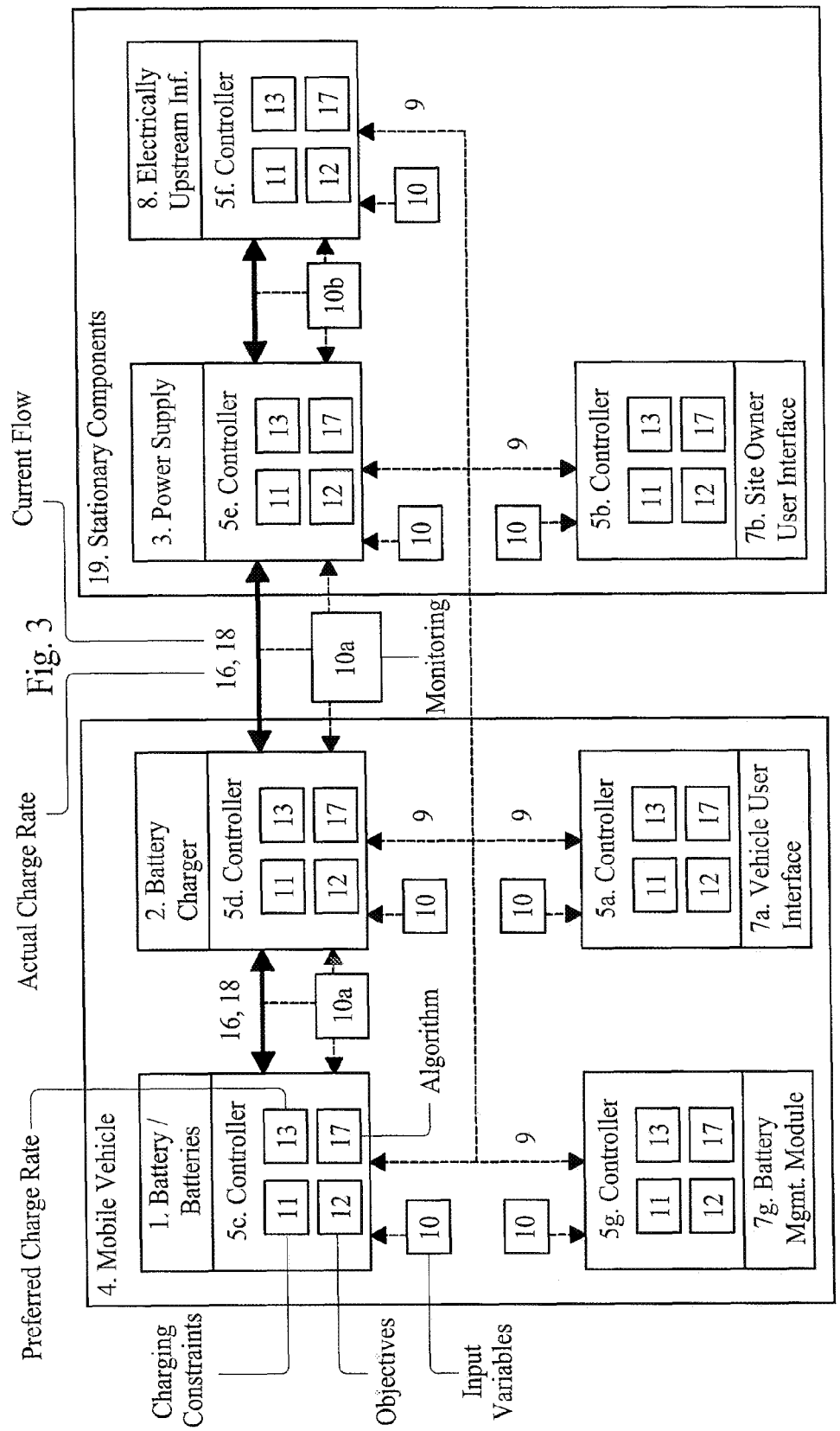

METHOD AND APPARATUS FOR SMART BATTERY CHARGING INCLUDING A PLURALITY OF CONTROLLERS EACH MONITORING INPUT VARIABLES

The invention was made with Government support under Contract DE-AC0676RLO 1830, awarded by the U.S. Department of Energy. The Government has certain rights in the invention.

TECHNICAL FIELD

This invention relates to methods and apparatus for charging batteries. More specifically, this invention relates to methods and apparatus for charging batteries that improves upon prior art methods by determining a charging rate while accounting for the constraints and preferences of a wide variety of users and devices that impact, or are impacted by, the charging process.

BACKGROUND OF THE INVENTION

The anticipation of widespread use of electric automobiles has caused many researchers and manufacturers to consider the demands for battery charging under a variety of different circumstances. These considerations have led to a variety of innovations that relate to various aspects of the problem. For example, one aspect of the widespread use of electric automobiles is the need to charge different types of batteries at commercial charging stations. To accommodate the different types of batteries, these commercial charging stations will need to have the capability to interact with the battery and analyze any considerations related to the battery type before applying a charge safely. Another consideration brought forth by the widespread use of electric cars relates to the likelihood that many of these electric cars will be charged in the homes of the users, utilizing electrical power produced by public and private electrical power producers. The supply, demand, and cost of electrical power supplied to these homes will vary over time. To accommodate that variance, the battery charging connections set up in the homes of these users will optimally determine a charging time and/or rate for the battery that best suites the needs of these public and private electrical power producers.

But it is not battery type alone that will create constraints on the charging process. Because electric vehicles are mobile, one cannot predict every permutation of battery, battery charger, charging station, and energy service provider that might become encountered as an electric vehicle travels about and charges its batteries at various homes, workplaces, and at public charging locations. Therefore, a method is needed to recognize and accommodate the numerous constraints that might be imposed by each battery type, battery charger, charging station and energy service provider.

While many innovations have been proposed to accommodate the various charging constraints and charging preferences posed by widespread charging of electric automobiles, the prior art has generally considered these various constraints and preferences in isolation. While many of these prior solutions and innovations are suitable when considering charging constraints and preferences in isolation, these prior innovations do not provide a solution that is optimal when the various constraints and preferences of all of the users and all devices connected to the battery are considered. Thus, there exists a need for methods and apparatus for charging batteries that is capable of considering the constraints and preferences of a wide variety of users and devices that impact, or are impacted by, the charging process. The present invention satisfies that need.

SUMMARY OF THE INVENTION

The present invention is a method for managing the charging and discharging of batteries. The present invention requires connecting at least one battery to a battery charger, and connecting the battery charger to a power supply. "Battery charger" as used herein means the interface between the power supply and the battery that controls the current flow or power exchange between the power supply and the battery.

In some applications, the power supply will be a home generator, solar collector system, or some other type of power source that is isolated from a public or privately owned power generation system that makes power available to residential and commercial customers via a large scale electrical distribution system (hereafter "the grid"). In other applications, however, the power supply will be the grid. In either circumstance, there may be instances where it is desired that the battery provide power to the power supply by discharging some or all of the electrical energy stored in the battery. In other instances, it will be desired that the power supply provide power to the battery, thus charging the battery. Accordingly, as used herein the "charge rate" for the battery can mean either that rate that the battery is being discharged, or that the battery is being charged, depending on the circumstances.

The present invention determines the charge rate for the battery by providing a plurality of controllers in communication with one and another. A controller is an electrical device that is capable of monitoring physical aspects of electrical systems, such as voltage, current, or power consumption, which is also capable of communicating with other electrical devices, including but not limited to other controllers, which may also be capable of accepting and implementing instructions, including preferences of vehicle and charging site owners, and which then constrains or advocates a preferred charging rate.

Monitoring may be performed by analog methods, such as checking for the presence or absence of a voltage on a communications circuit, or by digital communications protocols. Similarly, communication between controllers may take the form of any common communications protocol, including but not limited to TCP/IP, or by analog techniques. Instructions may be provided as software or as fixed circuitry capable of performing logical or other functional operations based on inputs from electrical signals. Examples of logical operations include, but are not limited to, "and/or," and "if then," statements.

The communication of constraints and preferred charge rates between the plurality of controllers is especially well suited to communication by a single analog voltage, the magnitude of which represents the actual charge rate that can be constrained by each controller and by the preferred charge rate generated at each controller.

Those having ordinary skill in the art will recognize that a wide variety of devices can be configured to act as controllers. For example, and not meant to be limiting, a controller may consist of a general purpose personal computer capable of being configured for a wide range of uses, but configured to accept inputs from one or more peripheral devices and further configured to communicate with other controllers. Alternatively, a controller may consist of firmware or other circuitry specifically designed and built to act as a controller for specific purposes, such as those set forth in this disclosure.

Accordingly, as used herein, the term "controller" means any form of circuitry, including without limitation software, hardware, firmware, and combinations thereof, that is configured to monitor any aspect of an electrical system and which is also capable of communicating with other electrical devices, including but not limited to other controllers. Controllers may further be configured to store and execute logical instructions and operations.

The method of the present invention may be concerned with a variety of input variables. For example, and not meant to be limiting, some of these input variables may be related to conditions of the power supply or the battery, while others may be external to the power supply and battery. Each of the controllers is assigned to monitor some subset of the input variables.

In one embodiment of the present invention, the controllers generate a set of charging constraints for each controller as a function of the subset of input variables monitored by that controller. For example, and not meant to be limiting, a controller monitoring the battery charger may set a limit for the maximum and minimum charging and discharging rates associated with the safe operation of the battery charger as the charging constraint. Similarly, and also not meant to be limiting, a controller monitoring the power supply may set a limit for the maximum and minimum charging and discharging rates associated with power currently available from the power supply as the charging constraint.

Continuing this embodiment of the present invention, the controller controlling the battery charger then defines an actual charge rate that falls within all of the sets of charging constraints generated by each of the controllers, and then provides a current flow between the battery and the battery charger at the actual charge rate. In this manner, the present invention allows the battery to be charged at a rate that that takes into account all of the sets of charging constraints generated by each of the controllers, and therefore all of the input variables monitored by the controllers.

While not meant to be limiting, in embodiments of the present invention that perform the forgoing method for defining an actual charge rate that falls within all of the sets of charging constraints generated by each of the controllers, the step of generating the controller's actual charge rate is preferably performed by monitoring the actual charge rate over time, inferring the charging constraints generated by other controllers, and using the inferred information to generate an actual charge rate.

The communication between the plurality of controllers is preferably through a shared electrical signal. The magnitude of the signal is preferably capable of being constrained by each controller's charge constraints, and the magnitude of the signal preferably represents the actual charge rate.

Preferably, but not meant to be limiting, the set of charging constraints for each controller include, but are not limited to, protecting the battery; protecting the battery charger; protecting the site's electrical power supply; the interests of the site owner; the interests of the battery charger system owner; protecting the equipment that resides electrically upstream of the site; the operational interests of an electrical service provider, the contractual interests of an electrical service provider, the preferential interests of an electrical service provider; and combinations thereof. By way of example, but not meant to be limiting, the interests of the site owner could include providing power at a time when the cost to the site owner were at a minimum. By way of further example, but also not meant to be limiting, the contractual interests of an electrical service provider could include a requirement that the site owner not charge electric vehicles except during limited off-peak hours. Accordingly, the skilled artisan will recognize the wide variety of possible interests that could be relevant to the site owner, the battery charger system owner, and the electrical service provider, and that all of these can be provided as constraints to the charging rate.

The plurality of controllers are preferably provided as residing at the battery or batteries, at the battery charger, at a battery management module, at a user interface, at the power supply, at a location upstream electrically from the power supply, and combinations thereof.

While the present invention is not limited to applications where the battery is provided as residing on a mobile vehicle and the power supply is provided as a stationary power supply, the present invention provides particular utility in such applications.

In another embodiment of the present invention, a plurality of controllers in communication with one and another is provided, where each of the controllers is monitoring a subset of input variables. In this embodiment of the present invention, a set of objectives is identified for each controller. These objectives are a set of logical or functional instructions performed by the controller. A preferred charge rate for each controller is then determined as a function of the set of objectives and the subset of input variables monitored by each controller. An actual charge rate is then defined using an algorithm that accounts for each of the preferred charge rates, and a current flow or power exchange between the battery and the battery charger is provided as the actual charge rate.

In one embodiment of the present invention and not intended to be limiting, the step of monitoring includes monitoring at least one input variable concerning the condition of the electrical power received from the power supply. Appropriate variables include, but are not limited to electrical frequency, variability of the electrical frequency, rate of change of the electrical frequency, electrical voltage potential, variability of the electrical voltage potential, rate of change of the electrical voltage potential, and combinations thereof.

One example, while not meant to be limiting, for defining an actual charge rate is by calculating a weighted average of the preferred charge rates that have been generated by the plurality of controllers and assigning said weighted average to the actual charge rate.

The communication between the plurality of controllers is preferably through a shared electrical signal. The magnitude of the signal is preferably capable of being influenced by each controller's preferred charge rate, and the magnitude of the signal preferably represents the actual charge rate.

The steps of generating a controller's preferred charge rate are preferably performed by monitoring the actual charge rate over time, inferring the preferred charge rates generated by other controllers, and using the inferred information to generate a preferred charge rate.

As with the embodiment where the controllers generate a set of charging constraints for each controller as a function of the subset of input variables monitored by that controller, in the step of identifying the set of objectives for each controller as a function of the subset of input variables, it is preferred that the set of objectives include, but are not limited to, protecting the battery, protecting the battery charger, protecting the site's electrical power supply, the interests of the site owner, the interests of the battery charger system owner, protecting the equipment that resides electrically upstream of the site, the operational interests of an electrical service provider, the contractual interests of an electrical service provider, the preferential interests of an electrical service provider, and combinations thereof.

Another embodiment of the present invention performs both the steps of 1) identifying a set of objectives for each controller and determining a preferred charge rate for each controller as a function of the set of objectives and the subset of input variables monitored by each controller and 2) generating a set of charging constraints for each controller as a function of the subset of input variables monitored by that controller. In this embodiment of the invention, the actual charge rate is defined using an algorithm that accounts for each of the preferred charge rates for each of the controllers, and is further confined by the charging constraints. The current is then flowed between the battery and the battery charger at the actual charge rate. The preferences for both steps 1 and 2 above are the same as for the embodiments that described the steps in isolation.

BRIEF DESCRIPTION OF THE DRAWINGS

The following detailed description of the embodiments of the invention will be more readily understood when taken in conjunction with the following drawings.

FIG. 3 is a schematic representation of the method of the present invention for managing the charging and discharging of batteries.

DETAILED DESCRIPTION OF THE PREFERRED EMBODIMENTS

Figure 1:
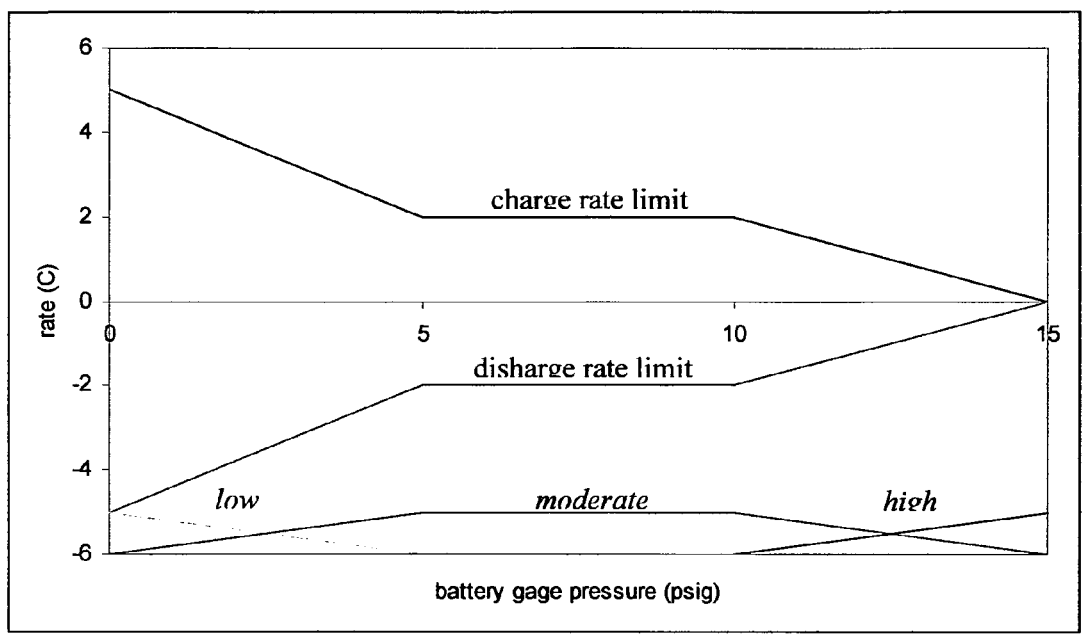
FIG. 1 is a graph showing charge constraints imposed as functions of measured battery pressure $\overline{P}_m$ (k) in an illustrative example of one aspect of the present invention. The charge rate C is a unit of measure known to practitioners of the art and is equivalent to the charge rate that will fully charge a battery from its discharged state in 1 hour. The person skilled in the art will also recognize that graphs may be similarly generated for charge constraints related to other input variables, including but not limited to ambient temperature and battery voltage. The descriptors "low," "moderate," and "high" were used for this function's piecewise definition.
Figure 2:
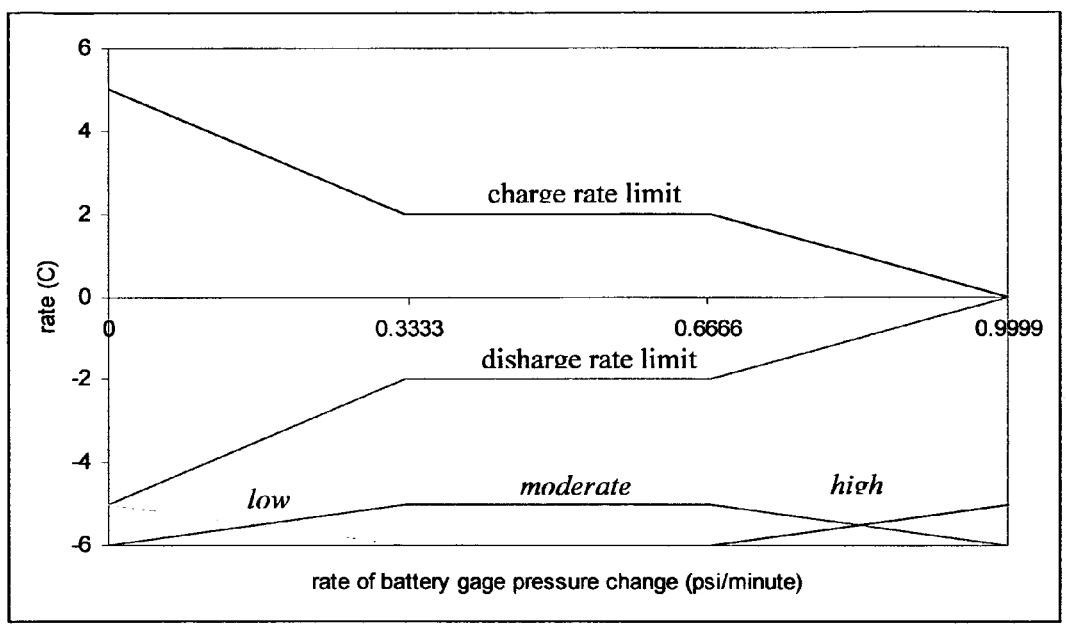
FIG. 2 is a graph showing the limits imposed on battery charge and discharge rates as functions of rate of change of measured battery pressure $\overline{dP}_m$ (k) in an illustrative example of one aspect of the present invention, thus showing that not only monitored inputs but also changes in those monitored inputs are allowable and useful input variables for the definition of charging constraints. Again, the person skilled in the art will also recognize that graphs may be similarly generated for charge constraints related to changes in other input variables, including but not limited to changes in ambient temperature and battery voltage.

For the purposes of promoting an understanding of the principles of the invention, reference will now be made to the embodiments illustrated in the drawings and specific language will be used to describe the same. It will nevertheless be understood that no limitations of the inventive scope is thereby intended, as the scope of this invention should be evaluated with reference to the claims appended hereto. Alterations and further modifications in the illustrated devices, and such further applications of the principles of the invention as illustrated herein are contemplated as would normally occur to one skilled in the art to which the invention relates.

FIG. 3 illustrates the method of the present invention for managing the charging and discharging of batteries. As shown in the figure, the steps comprise connecting at least one battery 1 to a battery charger 2, connecting the battery charger 2 to a power supply 3. As shown in the Figure, the battery may be provided as residing on a mobile vehicle 4 and the power supply 3 may be provided as a stationary component among stationary components 19. The battery charger 2, while shown residing on the mobile vehicle 4, may reside on either the mobile vehicle 4 or among the stationary components 19. The method further provides a plurality of controllers 5. The plurality of controllers 5 are provided as 5c residing at the battery 1, 5d residing at the battery charger 2, 5g residing at a battery management module 6, 5a and 5b residing at vehicle 7a and site owner 7a user interfaces, respectively, 5e residing at the power supply 3, and 5f residing at a location upstream electrically 8 from the power supply 3. As depicted in the lines 9 connecting the plurality of controllers 5, the plurality of controllers 5 are in communication with one and another.

The plurality of controllers 5 may communicate through a shared electrical signal 9, the magnitude of the signal 9 representing the actual charge rate, and the magnitude of the signal capable of being influenced by each controller's 5 preferred charge rate 13, each controller's 5 charging constraints 11, and combinations thereof. Each of the controllers 5 monitor a subset of input variables 10. In one embodiment not intended to limit the invention, the input variables 10b include electrical frequency, variability of the electrical frequency, rate of change of the electrical frequency, electrical voltage potential, variability of the electrical voltage potential, rate of change of the electrical voltage potential, and combinations thereof that are monitored from the electrical service to and from power supply 3.

As shown in the illustration, the method further generates a set of charging constraints 11 for each controller 5 as a function of the subset of input variables 10. The method further identifies a set of objectives 12 for each controller 5, generating a preferred charge rate 13 for each controller 5 as a function of the set of objectives 12 and the monitored input variables 10.

The charging constraints 11 may be selected from the group of protecting the battery; protecting the battery charger; protecting the site's electrical power supply; the interests of the site owner; the interests of the battery charger system owner; protecting the equipment that resides electrically upstream of the site; the operational interests of an electrical service provider, the contractual interests of an electrical service provider, the preferential interests of an electrical service provider; and combinations thereof.

The step of generating the controller's preferred charge rate 13 may be performed by monitoring 10a the actual charge rate 16 over time, inferring the charging constraints 11 and preferred charge rates 13 generated by other controllers 5, and using the inferred information to generate a preferred charge rate 13. The step of defining an actual charge rate 16 may be performed by using an algorithm 17 that accounts for each of the preferred charge rates 13 for each of the controllers 5 and that does not violate any of the charging constraints 11.

Algorithm 17 defining an actual charge rate 16 may be performed by calculating a weighted average of the preferred charge rates 13 that have been generated by the plurality of controllers 5 and assigning said weighted average to the actual charge rate 16, as further constrained by the charging constraints 11. The method then provides a current flow 18 between the battery 1 and the battery charger 2 at the actual charge rate 16.

While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Finally, all publications, patents, and patent applications cited in this specification are herein incorporated by reference to the extent not inconsistent with the present disclosure as if each were specifically and individually indicated to be incorporated by reference and set forth in its entirety herein.

The invention claimed is:

1. A method for managing charging and discharging of a battery comprising the steps of:
   a. connecting said battery to a battery charger,
   b. connecting the battery charger to a power supply,
   c. providing a plurality of controllers in communication with one and another, each of said controllers monitoring input variables, and an input variable monitored by one of the controllers is indicative of a condition of electrical power of the power supply and an input variable monitored by another of the controllers is rate of change of measured battery pressure,
   d. generating a set of charging constraints for each controller as a function of the input variables monitored by that controller and wherein the set of charging constraints for the another of the controllers includes the rate of change of measured battery pressure,
   e. defining an actual charge rate falling within all of the sets of charging constraints generated for the plurality of controllers including limiting the actual charge rate using the rate of change of measured battery pressure,
   f. providing a current flow between said battery and said battery charger at the actual charge rate.

2. The method of claim 1 further comprising providing the communication between the plurality of controllers through a shared electrical signal, a magnitude of the signal capable of being limited by each controller's charging constraints, and the magnitude of the signal representing the actual charge rate.

3. The method of claim 1 wherein the defining the actual charge rate comprises:
   a. monitoring the actual charge rate over time,
   b. inferring the charging constraints generated for other controllers providing inferred information, and
   c. using the inferred information to generate the actual charge rate.

4. The method of claim 1 wherein the plurality of controllers are provided as residing at the battery, at the battery charger, at a battery management module, at a user interface, at the power supply, and at a location upstream electrically from the power supply.

5. The method of claim 1 wherein the input variable monitored by the one of said controllers is indicative of a relationship of supply and demand of the electrical power of the power supply, and wherein the providing a current flow comprises providing using the relationship of supply and demand of the electrical power of the power supply.

6. The method of claim 1 wherein the input variable monitored by the one of said controllers is a relationship of supply and demand of the electrical power of the power supply, and wherein the providing a current flow comprises providing electrical energy from said battery, via said battery charger, to the power supply which is an electrical distribution grid.

7. The method of claim 1 wherein the input variable monitored by the one of said controllers is frequency of the electrical power of the power supply which is an electrical distribution grid.

8. The method of claim 1 wherein the defining comprises defining using a controller of the battery charger, and further comprising communicating the sets of charging constraints generated for the others of the controllers to the controller of the battery charger.

9. The method of claim 1 wherein the providing a current flow comprises providing electrical energy from said power supply to said battery, and further comprising:
   defining another actual charge rate falling within all of the sets of charging constraints generated for each of said controllers, and
   providing electrical energy from said battery to said power supply at the another actual charge rate.

10. The method of claim 1 wherein each of the controllers generates its own respective set of charging constraints.

11. A method for managing charging and discharging of a battery comprising the steps of:
   a. connecting said battery to a battery charger,
   b. connecting the battery charger to a power supply,
   c. providing a plurality of controllers in communication with one and another, each of said controllers monitoring a subset of input variables, wherein an input variable monitored by one of the controllers is rate of change of measured battery pressure,
   d. identifying a set of objectives for each controller,
   e. generating a preferred charge rate for each controller as a function of the set of objectives and the subset of input variables monitored by each controller, and wherein the generating the preferred charge rate for the one of the controllers comprises generating using the rate of change of measured battery pressure,
   f. defining an actual charge rate using the preferred charge rates which were generated for the plurality of controllers including limiting the actual charge rate using the rate of change of measured battery pressure,
   g. providing electrical energy from said battery to the power supply at the actual charge rate.

12. The method of claim 11 wherein the step of monitoring includes at least one input variable from a condition of electrical power received from the power supply selected from a group including electrical frequency, variability of the electrical frequency, rate of change of the electrical frequency, electrical voltage potential, variability of the electrical voltage potential, and rate of change of the electrical voltage potential.

13. The method of claim 11 wherein the plurality of controllers are provided as residing at the battery, at the battery charger, at a battery management module, at a user interface, at the power supply, and at a location upstream electrically from the power supply.

14. The method of claim 11 wherein the providing electrical energy comprises providing electrical energy to said power supply which is an electrical distribution grid.

15. The method of claim 11 wherein the defining comprises defining using a controller of the battery charger, and further comprising communicating the preferred charge rates which were generated for the others of the controllers to the controller of the battery charger.

16. The method of claim 11 wherein the monitoring comprises monitoring a relationship of supply and demand of electrical power of the power supply, and wherein the providing electrical energy comprises providing electrical energy from said battery to said power supply at the actual charge rate using the relationship of supply and demand of electrical power of the power supply which is an electrical distribution grid.

17. The method of claim 11 wherein the monitoring comprises monitoring frequency of electrical power upon the power supply, and wherein the providing electrical energy comprises providing electrical energy from said battery to the power supply at the actual charge rate as a result of the monitoring frequency of electrical power upon the power supply.

18. The method of claim 11 wherein the defining the actual charge rate comprises defining using an algorithm that accounts for each of the preferred charge rates.

19. The method of claim 11 wherein each of the controllers generates its own respective preferred charge rate.

20. A method for managing charging and discharging of a battery comprising the steps of:
   a. connecting said battery to a battery charger,
   b. connecting the battery charger to a power supply which is an electrical distribution grid,
   c. providing a plurality of controllers in communication with one and another, each of said controllers monitoring a subset of input variables, and an input variable monitored by one of the controllers is frequency of electrical power of the electrical distribution grid and an input variable monitored by another of the controllers is rate of change of measured battery pressure,
   d. generating a set of charging constraints for each controller as a function of the subset of input variables and wherein the set of charging constraints for the another of the controllers includes the rate of change of measured battery pressure,
   e. identifying a set of objectives for each controller,
   f. generating a preferred charge rate for each controller as a function of the set of objectives and the monitored input variables, and wherein the generating the preferred charge rate for the another of the controllers comprises generating using the rate of change of measured battery pressure,
   g. defining an actual charge rate using the preferred charge rates for the plurality of controllers and that does not violate any of the charging constraints including limiting the actual charge rate using the rate of change of measured battery pressure,
   h. at one moment in time, providing a current flow from said battery charger to said battery at the actual charge rate, and
   i. at another moment in time, discharging electrical energy from said battery to said electrical distribution grid as a result of the monitoring of the frequency by the one of the controllers.

21. The method of claim 20 wherein the generating the preferred charge rate of the one of the controllers comprises:
   a. monitoring the actual charge rate over time,
   b. inferring the charging constraints and preferred charge rates generated for other controllers providing inferred information, and
   c. using the inferred information to generate the preferred charge rate of the one of the controllers.

* * * * *

UNITED STATES PATENT AND TRADEMARK OFFICE
CERTIFICATE OF CORRECTION

PATENT NO. : 8,558,511 B2  
APPLICATION NO. : 12/384766  
DATED : April 7, 2009  
INVENTOR(S) : Donald J. Hammerstrom Page 1 of 1

It is certified that error appears in the above-identified patent and that said Letters Patent is hereby corrected as shown below:

On the Title Page

Item (57) ABSTRACT, line 7 – Replace "then generated" with -- then be generated --

Signed and Sealed this  
Thirty-first Day of December, 2013

Margaret A. Focarino  
*Commissioner for Patents of the United States Patent and Trademark Office*